(12) United States Patent
Harasaki

(10) Patent No.: US 10,401,871 B2
(45) Date of Patent: Sep. 3, 2019

(54) TRAVELLING VEHICLE SYSTEM AND METHOD FOR CONTROLLING TRAVELLING VEHICLE SYSTEM

(71) Applicant: MURATA MACHINERY, LTD., Kyoto-shi, Kyoto (JP)

(72) Inventor: Kazumi Harasaki, Inuyami (JP)

(73) Assignee: MURATA MACHINERY, LTD., Kyoto (JP)

( * ) Notice: Subject to any disclaimer, the term of this patent is extended or adjusted under 35 U.S.C. 154(b) by 220 days.

(21) Appl. No.: 15/649,674

(22) Filed: Jul. 14, 2017

(65) Prior Publication Data
US 2018/0046199 A1    Feb. 15, 2018

(30) Foreign Application Priority Data
Aug. 9, 2016   (JP) ................. 2016-156237

(51) Int. Cl.
G05D 1/02    (2006.01)
G05D 1/00    (2006.01)

(52) U.S. Cl.
CPC ......... G05D 1/0295 (2013.01); G05D 1/0027 (2013.01); G05D 1/0276 (2013.01); G05D 1/0282 (2013.01); G05D 1/0289 (2013.01); G05D 2201/0216 (2013.01)

(58) Field of Classification Search
CPC .. G05D 1/0027; G05D 1/0276; G05D 1/0289; G05D 1/0282; G05D 1/0295; G05D 2201/0216
See application file for complete search history.

(56) References Cited

U.S. PATENT DOCUMENTS

| | | | | |
|---|---|---|---|---|
| 2002/0065571 A1* | 5/2002 | Kamiguchi | ........ | G05B 19/4185 700/96 |
| 2003/0155470 A1* | 8/2003 | Young | .................... | A63H 19/24 246/122 A |
| 2009/0099715 A1* | 4/2009 | Cho | ........................ | B61L 27/04 701/20 |

(Continued)

FOREIGN PATENT DOCUMENTS

| | | |
|---|---|---|
| JP | 2002-175116 A | 6/2002 |
| JP | 2005-173779 A | 6/2005 |

*Primary Examiner* — Mussa A Shaawat
(74) *Attorney, Agent, or Firm* — Keating & Bennett, LLP (57) ABSTRACT

A travelling vehicle system that allows smooth travelling of a priority travelling vehicle includes travelling vehicles that travel along a route and a host controller that controls the travelling vehicles. The host controller includes a priority travelling vehicle transmitter that selects a priority travelling vehicle among the travelling vehicles, a passage command transmitter that transmits a passage command to a normal travelling vehicle to pass through a point in a predetermined range on the route which the priority travelling vehicle is scheduled to pass through, the normal travelling vehicle having a stop command to schedule to stop at the point, and a cancel command transmitter that transmits a cancel command to the normal travelling vehicle to cancel the given passage command when the priority travelling vehicle passes through the point. The normal travelling vehicle stops at the point in accordance with the stop command of the normal travelling vehicle, when the normal travelling vehicle receives the cancel command from the cancel command transmitter.

8 Claims, 7 Drawing Sheets

(56) References Cited

U.S. PATENT DOCUMENTS

| | | | | |
|---|---|---|---|---|
| 2011/0125350 A1* | 5/2011 | Won | ............................ | G08G 1/01 |
| | | | | 701/20 |
| 2011/0184596 A1* | 7/2011 | Andreasson | ............ | B61L 23/34 |
| | | | | 701/19 |
| 2012/0078411 A1* | 3/2012 | Shimamura | ....... | H01L 21/67276 |
| | | | | 700/215 |
| 2012/0259486 A1* | 10/2012 | Hrdlicka | ................. | B61L 3/006 |
| | | | | 701/19 |
| 2013/0297199 A1* | 11/2013 | Kapp | ...................... | B61L 3/006 |
| | | | | 701/411 |
| 2015/0013312 A1* | 1/2015 | Gallagher | .......... | F02M 25/0818 |
| | | | | 60/274 |

* cited by examiner

| TRAVELLING VEHICLE ID | COMMAND ID | DEGREE OF PRIORITY | CURRENT POSITION | DESTINATION | TRAVELLING STATE | CARGO STATE | FORWARD STATE | PASSAGE COMMAND STATE |
|---|---|---|---|---|---|---|---|---|
| 01 | TS1 | PR1 | Pa1 | Pb1 | VS1 | LS1 | FS1 | SR1 |
| 02 | TS2 | PR2 | Pa2 | Pb2 | VS2 | LS2 | FS2 | SR2 |

TRAVELLING VEHICLE SYSTEM AND METHOD FOR CONTROLLING TRAVELLING VEHICLE SYSTEM

CROSS REFERENCE TO RELATED APPLICATIONS

This application claims the benefit of priority to Japanese Patent Application No. 2016-156237 filed on Aug. 9, 2016. The entire contents of this application are hereby incorporated herein by reference.

BACKGROUND OF THE INVENTION

1. Field of the Invention

The present invention relates to a travelling vehicle system, and a method for controlling a travelling vehicle system.

2. Description of the Related Art

In a semiconductor device manufacturing factory, and the like, a cargo containing, for example, semiconductor wafers or reticles is transported by a travelling vehicle system. This travelling vehicle system includes a plurality of travelling vehicles that travel along a route (track), and a controller (e.g., a host controller) for controlling the plurality of travelling vehicles. Each of the plurality of travelling vehicles transmits its own current position and the like to the controller by communication such as wireless communication. The controller decides a travelling vehicle that will be in charge of transporting a cargo based on positions of the travelling vehicles, and the like, and transmits a travelling command to the decided travelling vehicle.

The travelling vehicle may be set as a priority travelling vehicle that transports a cargo with preference over the other travelling vehicles in accordance with a destination, a type of a transporting object, or the like (e.g., see Japanese Patent No. 4,182,874 listed below). In Japanese Patent No. 4,182,874, with reference to a vehicle information database where information indicating operation states of a plurality of vehicles (travelling vehicles) is stored while being updated, a normal travelling vehicle to be overtaken by an express vehicle (the priority travelling vehicle) is identified based on the operation states of the respective vehicles, to decide a circling route to be used when the identified normal travelling vehicle is overtaken by the express vehicle.

In Japanese Patent No. 4,182,874 described above, when a merging part is present on the route which the priority travelling vehicle intends to pass through, a travelling vehicle cannot be prevented from entering the passage route of the priority travelling vehicle and stopping on this passage route, the travelling vehicle being not present on the passage route of the priority travelling vehicle at the point of time when a controller issues a circling command, such as a travelling vehicle travelling, toward the merging part, on a route different from the route of the priority travelling vehicle. This results in a problem that the travelling vehicle having stopped on the passage route of the priority travelling vehicle blocks smooth travelling of the priority travelling vehicle.

SUMMARY OF THE INVENTION

In view of the above circumstances, preferred embodiments of the present invention provide a travelling vehicle system that allows smooth travelling of a priority travelling vehicle, and a method for controlling a travelling vehicle system.

A travelling vehicle system according to a preferred embodiment of the present invention is a travelling vehicle system including: a plurality of travelling vehicles that travel along a route; and a host controller that controls the travelling vehicles. The host controller is configured or programmed to include a priority travelling vehicle transmitter that selects a priority travelling vehicle among the plurality of travelling vehicles, a passage command transmitter that transmits a passage command to a normal travelling vehicle to pass through a point in a predetermined range on the route which the priority travelling vehicle is scheduled to pass through, the normal travelling vehicle having a stop command to schedule to stop at the point, and a cancel command transmitter that transmits a cancel command to the normal travelling vehicle to cancel the given passage command when the priority travelling vehicle passes through the point. The normal travelling vehicle stops at the point in accordance with the stop command of the normal travelling vehicle, when the normal travelling vehicle receives the cancel command from the cancel command transmitter.

A method for controlling a travelling vehicle system according to another preferred embodiment of the present invention is a method for controlling a travelling vehicle system including a plurality of travelling vehicles that travel along a route, and a host controller that controls the travelling vehicles, the method including: selecting a priority travelling vehicle among the plurality of travelling vehicles; transmitting a passage command to a normal travelling vehicle to pass through a point in a predetermined range on the route which the priority travelling vehicle is scheduled to pass through, the normal travelling vehicle having a stop command to schedule to stop at the point; transmitting a cancel command to the normal travelling vehicle to cancel the given passage command when the priority travelling vehicle passes through the point; and causing the normal travelling vehicle to stop at the point in accordance with the stop command of the normal travelling vehicle, when the normal travelling vehicle receives the cancel command.

When the normal travelling vehicle having the stop command receives the passage command from the passage command transmitter and then receives the cancel command from the cancel command transmitter before passing through the point, the normal travelling vehicle may stop at the point in accordance with the stop command without passing through the point. The normal travelling vehicle having the stop command may periodically transmit, to the host controller, state information indicating the point at which the normal travelling vehicle is scheduled to stop, and the host controller may use the state information to select the normal travelling vehicle being a target that transmits the passage command among the plurality of travelling vehicles. The predetermined range may be a range in which the priority travelling vehicle travels after transmission of the state information until transmission of the next state information. The priority travelling vehicle may calculate the predetermined range by using a travelling speed and a period in which the state information is transmitted, and may transmit a calculation result to the host controller as part of the state information. The host controller may transmit an information request for requesting the state information to each of the plurality of travelling vehicles, and each of the plurality of travelling vehicles may transmit the state information to the host controller as a response to the information request. The host controller may transmit the passage command or the cancel command as part of the information request.

According to various preferred embodiments of the present invention, a passage command is transmitted to a normal travelling vehicle having a stop command to schedule to stop at a point in a predetermined range which a priority travelling vehicle is scheduled to pass through. Hence it is possible to prevent the normal travelling vehicle from stopping at the point when the priority travelling vehicle arrives at the point, and to achieve smooth travelling of the priority travelling vehicle. The passage command is also issued to the normal travelling vehicle having the stop command to schedule to stop at a point on a passage route of the priority travelling vehicle, coming from a route different from the priority travelling vehicle. Thus, it is possible to ensure smooth travelling of the priority travelling vehicle. When the priority travelling vehicle passes through the point, a cancel command to cancel the passage command is transmitted. Hence, the normal travelling vehicle having received the passage command is able to stop at the point in accordance with the stop command that the normal travelling vehicle originally has, without unnecessarily passing through the point. As described above, the normal travelling vehicle is selected using the predetermined range which the priority travelling vehicle is scheduled to pass through and the point at which the other travelling vehicle is scheduled to stop. This eliminates the need to obtain, for example, the travelling order, the current positional relation, and the like of the priority travelling vehicle and the normal travelling vehicles, thus allowing smooth travelling of the priority travelling vehicle by simple control.

In the travelling vehicle system in which, when the normal travelling vehicle having the stop command receives the passage command from the passage command transmitter and then receives the cancel command from the cancel command transmitter before passing through the point, the normal travelling vehicle stops at the point in accordance with the stop command without passing through the point, it is possible to reliably prevent the normal travelling vehicle from unnecessarily passing through the point. In the travelling vehicle system in which the host controller uses the state information to select the normal travelling vehicle being the target for the passage command, the state information from the travelling vehicle shows a stoppage scheduled position, and it is thus possible to easily select the travelling vehicle being the target for the passage command. In the travelling vehicle system in which the predetermined range is a range in which the travelling vehicle travels until transmission of the next state information, a necessary and sufficient range is set for the predetermined range. Hence, it is possible to appropriately select the travelling vehicle being the target for the passage command and to prevent a decrease in operation rate of the travelling vehicle. In the travelling vehicle system in which the priority travelling vehicle calculates the predetermined range and transmits a calculation result to the host controller as part of the state information, it is possible to easily calculate the predetermined range. Further, as compared with a case where the calculation result of the predetermined range is transmitted separately from the state information, it is possible to prevent the transmission processing from becoming complicated. In the travelling vehicle system in which the host controller transmits an information request and the travelling vehicle transmits the state information to the host controller as a response to the information request, the host controller manages the timing for acquiring the state information, thus enabling stable control of the travelling vehicle. In the travelling vehicle system in which the host controller transmits the passage command or the cancel command as part of the information request, it is possible to prevent the communication processing from becoming complicated as compared with the case where the passage command or the cancel command is transmitted separately from the information request.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
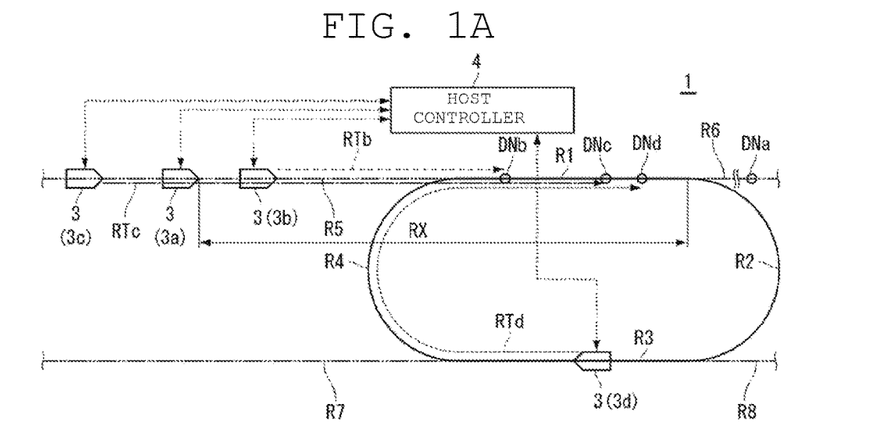
FIGS. 1A and 1B are views illustrating a travelling vehicle system according to a preferred embodiment of the present invention.
Figure 1B:
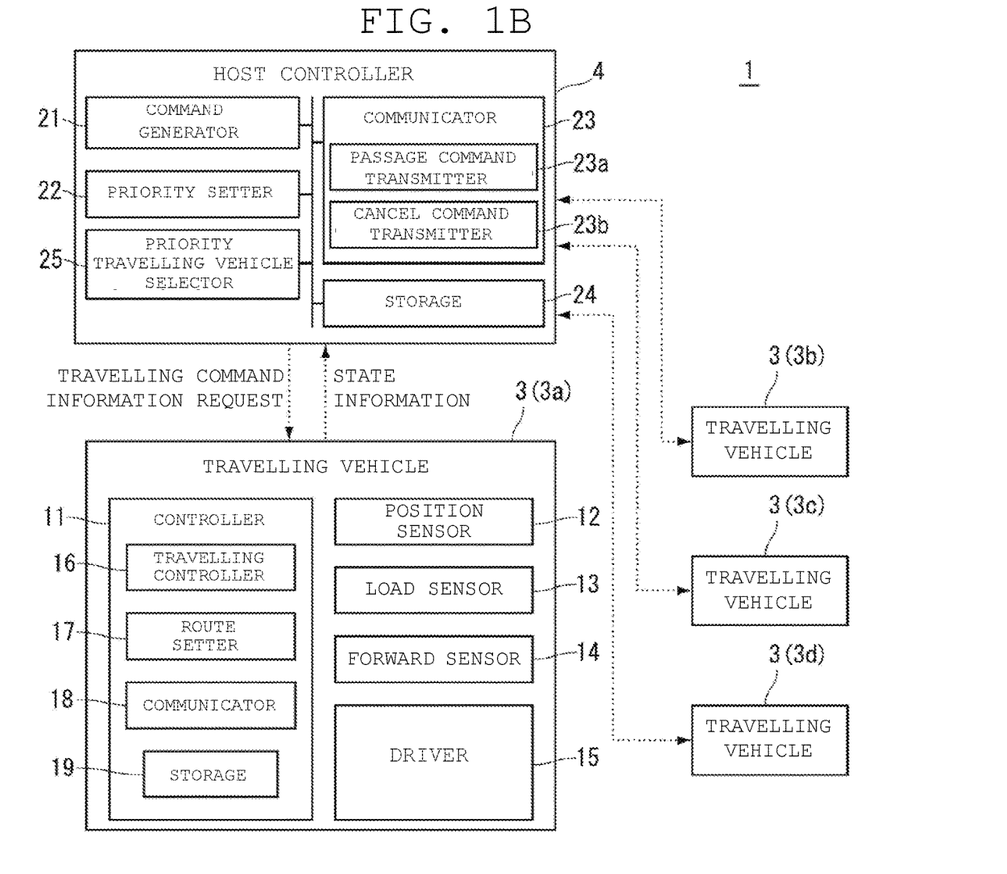

Hereinafter, preferred embodiments of the present invention will be described with reference to the drawings. FIGS. 1A and 1B are views illustrating a travelling vehicle system according to a first preferred embodiment of the present invention. A travelling vehicle system 1 is provided with a route (track) 2, a plurality of travelling vehicles 3, and a host controller 4. The travelling vehicle system 1 preferably is a transport system installed in a semiconductor device manufacturing factory, for example, and transports a container such as a FOUP (front opening unified pod) that houses semiconductor wafers used for manufacturing semiconductor devices, or a reticle pod that houses a processing member such as a reticle.

Each of the plurality of travelling vehicles 3 travels along the route 2. Hereinafter, the plurality of travelling vehicles 3 are denoted by reference numeral 3 when not individually distinguished, and denoted by reference numerals 3a, 3b, 3c, and 3d when individually distinguished. In the following description, a travelling vehicle 3a is a priority travelling vehicle, and travelling vehicles 3b, 3c, 3d are normal travelling vehicles. The priority travelling vehicle 3a is, for example, a travelling vehicle transporting an express lot, or travelling to a position to pass the express lot. The normal travelling vehicle 3b (hereinafter referred to as a first travelling vehicle as appropriate) is travelling on the same route (e.g., a section R5) as the priority travelling vehicle 3a and preceding the priority travelling vehicle 3a. The normal travelling vehicle 3c (hereinafter referred to as a second travelling vehicle as appropriate) is travelling on the same route (the section R5) as the priority travelling vehicle 3a and subsequent to the priority travelling vehicle 3a. The normal travelling vehicle 3d (hereinafter referred to as a third travelling vehicle as appropriate) is travelling on a route (a section R3) different from the priority travelling vehicle 3a and scheduled to travel on the route (a section R1) on which the priority travelling vehicle 3a is scheduled to travel. Although FIG. 1A illustrates the priority travelling vehicle 3a and the normal travelling vehicles 3b, 3c, 3d, the number of travelling vehicles 3 provided in the travelling vehicle system 1 is freely selectable.

The travelling vehicle 3 preferably is an overhead travelling vehicle, for example, and the route 2 preferably is a travelling rail provided on a ceiling of a clean room, or the like. The route 2 is provided adjacent to a processing device (not illustrated), a stocker (not illustrated), or the like. The above-mentioned processing device may be, for example, an exposure device, a coater/developer, a film forming device, or an etching device, and performs a variety of processing on the semiconductor wafers in the container transported by the travelling vehicle 3. The above-mentioned stocker (automatic warehouse) preferably stores the container transported by the travelling vehicle 3. Note that the travelling vehicle 3 may be a tracked vehicle travelling on the ground, and in this case, the route 2 is provided on a floor or the like.

The route 2 includes a branching point and a merging point (hereinafter generically referred to as a junction). The route 2 is divided into a plurality of sections R1 to R8, and each section of the route 2 is, for example, a portion from a junction to the next junction. It is defined as a travelling rule that, for example, the travelling vehicle 3 travels only in a predetermined direction (or does not travel reversely) in each section of the route 2.

Each section of the route 2 is classified into a main route (indicated by a solid line in FIG. 1A) and a sub-route (indicated by a chain double-dashed line in FIG. 1A). In the example of FIG. 1A, sections belonging to the main route are the sections R1 to R4, and sections belonging to the sub-route are the sections R5 to R8. The main route is, for example, an intra-bay section, a trunk line, or the like, and includes a circling route (e.g., the sections R1 to R4) that the travelling vehicle 3 can go around. The sub-route is, for example, a bypass linking between intra-bay sections, branch lines, or main routes, and includes a section branched from the main route and a section merging into the main route. It is defined as a travelling rule that the travelling vehicle travels in the section on the sub-route when the section is specified, and it travels in the section on the main route when the section is not specified.

The travelling vehicle 3 transmits state information (see, for example, FIG. 1B) of the travelling vehicle 3 to the host controller 4. The host controller 4 generates a travelling command based on the state information received from the travelling vehicle 3. The travelling vehicle 3 receives the travelling command from the host controller 4 and travels on the route 2. The travelling command includes information of a travelling route on which the travelling vehicle 3 is scheduled to travel at the time of transporting a predetermined cargo. This information of the travelling route is information specifying at least a portion of the travelling route of the travelling vehicle 3 from a start point to a destination (a point).

Herein, a travelling route of the priority travelling vehicle 3a is assumed to be a route from the section R5 toward the section R6 via the section R1. In FIG. 1A, reference numeral DNa denotes a destination at which the priority travelling vehicle 3a is scheduled to stop travelling. The destination DNa is set, for example, in the section R6, but may be set in a section farther than the section R6. Reference numeral RTb denotes a travelling route of the normal travelling vehicle 3b, and reference numeral DNb denotes a destination at which the normal travelling vehicle 3b is scheduled to stop travelling. Reference numeral RTc denotes a travelling route of the normal travelling vehicle 3c, and reference numeral DNc denotes a destination at which the normal travelling vehicle 3c is scheduled to stop travelling. Reference numeral RTd denotes a travelling route of the normal travelling vehicle 3d, and reference numeral DNd denotes a destination at which the normal travelling vehicle 3d is scheduled to stop travelling. Note that the normal travelling vehicles 3b, 3c, 3d have transport commands for loading and unloading cargoes at the respective destinations DNb, DNc, DNd, and the like. In the present preferred embodiment, these transport commands correspond to the stop commands to stop (or scheduled to stop) the priority travelling vehicle 3a and the normal travelling vehicles 3b, 3c, 3d at the respective destinations (points).

All of the plurality of travelling vehicles 3 have similar configurations. Herein, the configuration of the priority travelling vehicle 3a is described as a typical example, and the configurations of the other travelling vehicles 3 are omitted. As illustrated in FIG. 1B, the travelling vehicle 3 (the priority travelling vehicle 3a) is provided with a controller 11, a position sensor 12, a load sensor 13, a forward sensor 14, and a driver 15. The driver 15 supplies drive force to cause the travelling vehicle 3 to travel. Further, the driver 15 supplies drive force used for cargo handling, such as loading and unloading of a cargo.

The position sensor 12 detects a current position of the priority travelling vehicle 3a. The position sensor 12 is communicably connected with the controller 11 by wire or wirelessly, and supplies the detected current position of the travelling vehicle 3 to the controller 11. The load sensor 13 detects the presence or absence of a cargo. The load sensor 13 is communicably connected with the controller 11 by wire or wirelessly, and supplies the detection result to the controller 11. The forward sensor 14 monitors a forward view of the priority travelling vehicle 3a in an advancing direction (a travelling direction), to detect whether another travelling vehicle (e.g., the normal travelling vehicle 3b) is present ahead. The forward sensor 14 is communicably connected with the controller 11 by wire or wirelessly, and supplies the detection result to the controller 11.

Note that one or both of the position sensor 12 and the forward sensor 14 may not be mounted in the priority travelling vehicle 3a and may be installed on the route 2, for example. Further, the travelling vehicle system 1 may not include at least one of the position sensor 12, the load sensor 13, and the forward sensor 14, and may include another sensor.

The controller 11 is mounted in the priority travelling vehicle 3a and receives a command from the host controller 4 to control each element or component of the travelling vehicle 3. The controller 11 is configured or programmed to include a travelling controller 16, a route setter 17, a communicator 18, and a storage 19. The communicator 18 is communicably connected with a communicator 23 of the host controller 4 by wireless LAN or the like. The communicator 18 receives a travelling command and an information request from the communicator 23 of the host controller 4. The travelling command is a command to specify a travelling route of the travelling vehicle 3. The information request is a command to request transmission of the state information of the travelling vehicle 3. The communicator 18 causes the storage 19 to store the received travelling command and information request.

The route setter 17 sets the travelling route based on the travelling command. The travelling command, for example, represents the travelling route specified by the host controller 4 while omitting a portion of the sections belonging to the main route, and the route setter 17 complements the omitted section to restore (construct) the travelling route. For example, the storage 19 stores map information representing the sections belonging to the main route, and the route setter 17 determines that a section not specified by the travelling command is the section belonging to the main route, to complement this section from the map information. The travelling controller 16 controls each component or element of the travelling vehicle 3 based on the travelling command. For example, the travelling controller 16 controls the driver 15 such that the travelling vehicle 3 travels along the travelling route constructed by the route setter 17 based on the travelling command.

Further, the travelling controller 16 generates state information of the travelling vehicle 3, and causes the communicator 18 to execute transmission of the state information in response to the information request from the host controller 4. The travelling controller 16 causes the variety of sensors (e.g., the position sensor 12) mounted in the travelling vehicle 3 to execute detection, and causes the storage 19 to store the detection result. Further, as information of a predetermined range RX in which the travelling vehicle 3 is scheduled to travel, the travelling controller 16 decides a distance of the predetermined range RX (hereinafter referred to as a travelling scheduled distance). The travelling scheduled distance is a distance (a path) along the route 2.

The travelling controller 16 multiplies a travelling speed of the travelling vehicle 3 by predetermined time to calculate a distance, by which the travelling vehicle 3 is advanced in the predetermined time, as the travelling scheduled distance, the predetermined time is, for example, a period in which the communicator 18 of the travelling vehicle 3 transmits the state information to the communicator 23 of the host controller 4. That is, the predetermined range RX is a range in which the priority travelling vehicle 3a travels after transmission of the state information until transmission of the next state information. Note that the travelling scheduled distance may be a predetermined fixed value, such as about 10 m or about 20 m, for example.

Figure 2A:
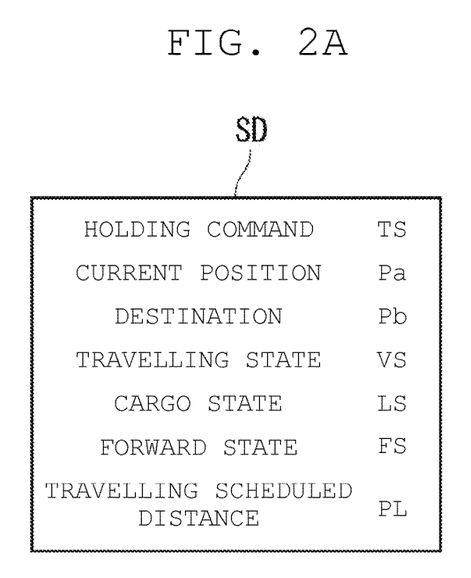
FIG. 2A is a diagram illustrating state information.
Figure 2B:
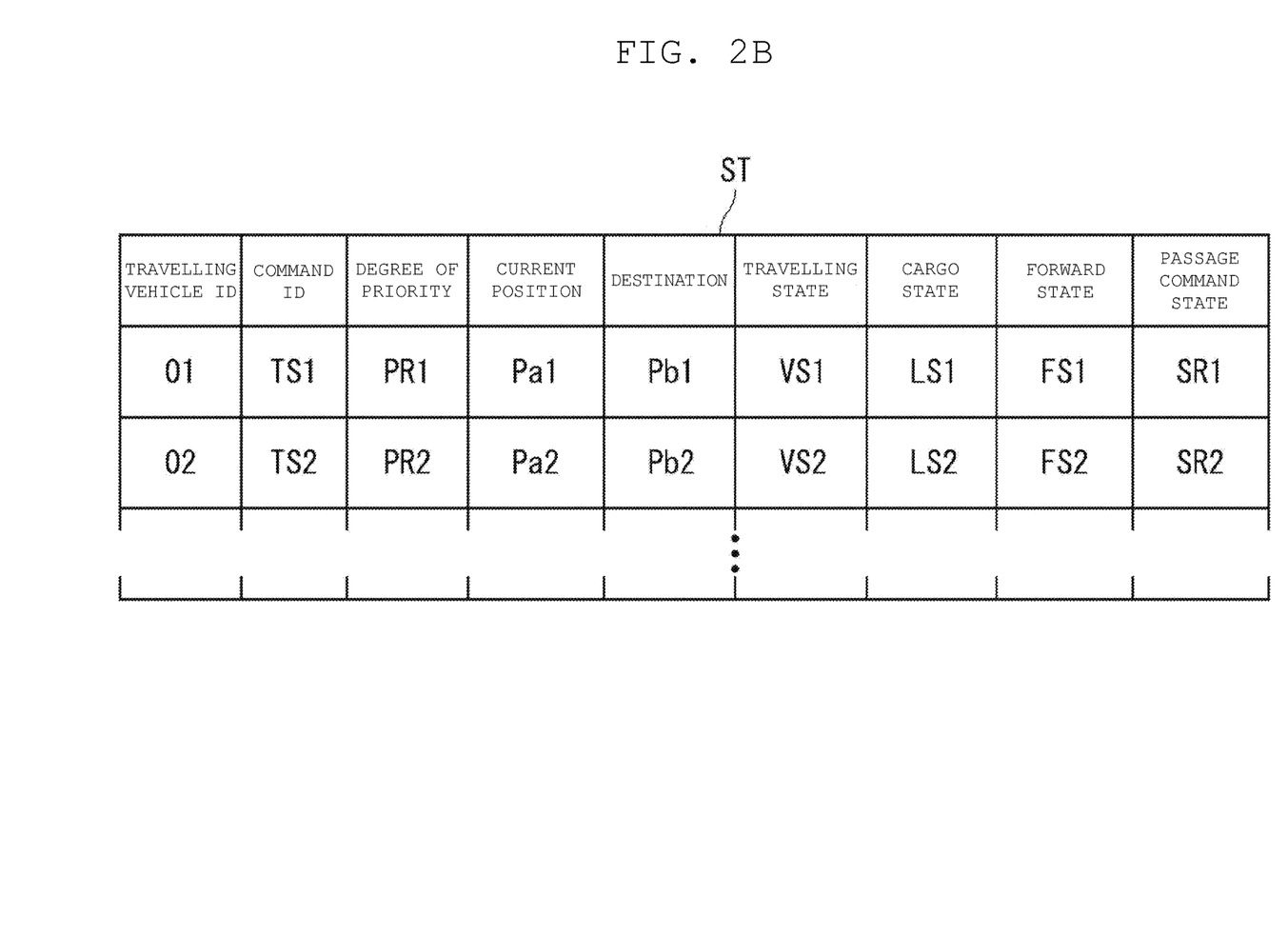
FIG. 2B is a diagram illustrating a state table.

FIG. 2A is a diagram illustrating state information, and FIG. 2B is a diagram illustrating a state table. State information SD of FIG. 2A includes holding information (TS), a current position (Pa), a destination (Pb), a travelling state (VS), a cargo state (LS), a forward state (FS), and a travelling scheduled distance (PL). The holding command (TS) is information of a command defined in the travelling command stored in the storage 19, or the like, and held by the travelling vehicle 3. The current position (Pa) is information of the current position of the travelling vehicle 3, detected by the position sensor 12. The destination (Pb) is information defined in the travelling command stored in the storage 19, or the like, and shows the destination of the travelling vehicle 3.

The travelling state (VS) is information indicating the current speed of the travelling vehicle 3. For example, the travelling state (VS) shows that the travelling vehicle 3 is travelling when its speed is higher than 0, and the travelling state (VS) shows that the travelling vehicle 3 is at a stop when its speed is 0. The cargo state (LS) includes information indicating the presence or absence of the cargo detected by the load sensor 13, information of a type of a cargo being transported (e.g., an ID number allocated to the cargo), and the like. The forward state (FS) is information of a forward view of the travelling vehicle 3, detected by the forward sensor 14, and shows whether another travelling vehicle 3 is present ahead of the travelling vehicle 3 in a detection range of the forward sensor 14.

Returning to the description of FIG. 1B, the storage 19 is a nonvolatile memory or the like, and stores various pieces of information such as state information. The travelling controller 16 periodically generates state information, and updates the state information stored in the storage 19 to the latest state information. The communicator 18 transmits the latest state information stored in the storage 19 to the communicator 23 of the host controller 4 by control of the travelling controller 16.

The host controller 4 is configured or programmed to include a command generator 21, a priority setter 22, the communicator 23, a storage 24, and a priority travelling vehicle transmitter 25. The communicator 23 is communicable with the communicator 18 of the travelling vehicle 3 by wireless LAN or the like, and receives the state information from the communicator 18. For example, the communicator 23 of the host controller 4 transmits, to the travelling vehicle 3, an information request for requesting transmission of the state information, and the communicator 18 of the travelling vehicle 3 transmits the state information in response to the information request. Further, the communicator 23 is provided with a passage command transmitter 23a that transmits a passage command generated in the command generator 21, to be described later, and a cancel command transmitter 23b that transmits a cancel command generated in the command generator 21. The storage 24 stores the state information received by the communicator 23. For example, the storage 24 stores a state table ST (illustrated in FIG. 2B) where respective states of the plurality of travelling vehicles 3 are stored.

The state table ST of FIG. 2B is table data, and includes items of "travelling vehicle ID", "command ID", "degree of priority", "current position", "destination", "travelling state", "cargo state", "forward state", and "passage command state." The "travelling vehicle ID" is an ID number (e.g., 01, 02, . . . ) previously allocated to each travelling vehicle 3. The "command ID" is information corresponding to the holding command (TS) of the state information SD, and is an ID number (e.g., TS1, TS2, . . . ) previously allocated in accordance with a content of the demand. For example, a command held in the travelling vehicle 3 with the "travelling vehicle ID" of "01" is represented as "TS1."

The "degree of priority" is a parameter that is allocated to each travelling vehicle 3. The priority setter 22 of FIG. 1B sets a degree of priority based on one or both of the type of the cargo transported by the travelling vehicle 3 and the destination of the travelling vehicle 3. For example, when the type of the cargo transported by the travelling vehicle 3 (e.g., the priority travelling vehicle 3a) is a predetermined type (e.g., the express lot), the priority setter 22 sets the degree of priority of this travelling vehicle 3 higher than the degrees of priority of the other travelling vehicles 3 (e.g., the normal travelling vehicle 3c). For example, when the cargo transported by the travelling vehicle 3 (e.g., the normal travelling vehicle 3b) is not the predetermined type, the priority setter 22 sets the degree of priority of this travelling vehicle 3 the same as the degrees of priority of the other travelling vehicles 3 (e.g., the normal travelling vehicle 3c). The travelling vehicle 3 with a degree of priority set by the priority setter 22 higher than the degrees of priority of the other travelling vehicles 3 is selected to be the priority travelling vehicle 3a by the priority travelling vehicle transmitter 25. The priority setter 22 may define and function as the priority travelling vehicle transmitter 25. That is, the priority setter 22 may select, as the priority travelling vehicle, the travelling vehicle 3 with the degree of priority higher than the degrees of priority of the other travelling vehicles 3.

Note that the "degree of priority" may be set in accordance with the destination of the travelling vehicle 3. For example, when the destination of the travelling vehicle 3 has been set in a processing device with a relatively high operation rate among a plurality of processing devices, the priority setter 22 may set the degree of priority of this travelling vehicle 3 higher than those of the other travelling vehicles 3. The "degree of priority" may be inputted (specified, set) by the operator, and in this case, the host controller 4 may not be provided with the priority setter 22. Further, the priority setter 22 may be provided in a device different from the host controller 4.

The "degree of priority" is represented as follows. For example, the degree of priority of the travelling vehicle 3 with the "travelling vehicle ID" of "01" is "PR1", and the degree of priority of the travelling vehicle 3 with the "travelling vehicle ID" of "02" is "PR2." The parameter values such as "PR1" and "PR2" are, for example, represented by "99" when the degree of priority is high, and represented by "00" when the degree of priority is normal. The "degree of priority" may be a flag showing whether or not the travelling vehicle is to be prioritized or, for example, information representing a state where the travelling vehicle is prioritized as "1" and the state where the travelling vehicle is not prioritized as "0." The command generator 21 (see, for example, FIG. 1B) transmits a passage command to the travelling vehicle 3 in accordance with the "degree of priority." The passage command will be described later.

The "current position", the "destination", the "travelling state", the "cargo state", and the "forward state" are respective pieces of information corresponding to the current position (Pa), the destination (Pb), the travelling state (VS), the cargo state (LS), and the forward state (FS) in the state information SD (see, for example, FIG. 2A). For example, for the travelling vehicle 3 with the "travelling vehicle ID" of "01", the current position" is "Pa1", the "destination" is "Pb1", the "travelling state" is "VS1", the cargo state" is "LS1", and the forward state" is "FS1."

The above state table ST is updated in accordance with the state information received by the communicator 23. Returning to the description of FIG. 1B, based on the above state table ST and information of a destination that is defined in accordance with a previously provided task (e.g., transport of a cargo) or the like, the command generator 21 decides the travelling vehicle 3 to be in charge of a command (a transport command, a travelling command) in accordance with this task. The destination is, for example, an access point (e.g., a load port, a buffer, a warehousing/shipping port) at which a cargo can be received from and passed to the processing device side or the stocker side. Based on the destination that is defined in accordance with the task and the "current position" of the travelling vehicle 3 to be in charge of this task, the command generator 21 decides a route on which this travelling vehicle 3 is scheduled to travel, and generates a travelling command to specify the decided route.

Further, the command generator 21 generates a passage command to pass through the points (the destinations DNb, DNc, DNd) in the predetermined range RX on the route which the priority travelling vehicle 3a is scheduled to pass through, to the normal travelling vehicles 3b, 3c, 3d having the stop commands to schedule to stop at the points. For example, the passage command to the normal travelling vehicle 3b is a command to allow passage of the normal travelling vehicle 3b through the destination DNb not in accordance with the stop command (the transport command) of the normal travelling vehicle 3b. The passage command to the normal travelling vehicle 3c is a command to allow passage of the normal travelling vehicle 3c through the destination DNc not in accordance with the stop command (the transport command) of the normal travelling vehicle 3c. The passage command to the normal travelling vehicle 3d is a command given to the normal travelling vehicle 3d to allow passage through the destination DNd not in accordance with the stop command (the transport command) of the normal travelling vehicle 3d.

The command generator 21 uses the state information to select the vehicle 3 being a target that transmits the passage command among the plurality of travelling vehicles 3. For example, when the communicator 23 receives state information from the travelling vehicle 3, the command generator 21 refers to the "degree of priority" of the travelling vehicle 3 being a transmission source in the state table ST (see, for example, FIG. 2B), to determine whether or not the travelling vehicle 3 being the transmission source is the priority travelling vehicle 3a. The command generator 21 refers to the current position (Pa) and the travelling scheduled distance (PL) in the state information (see, for example, FIG. 2A) from the priority travelling vehicle 3a, to specify the predetermined range RX. Further, the command generator 21 refers to the state table ST (see, for example, FIG. 2B) to specify the normal travelling vehicles 3b, 3c, 3d with "destinations" thereof being present in the predetermined range RX, and generates passage commands to the normal travelling vehicles 3b, 3c, 3d.

The passage command transmitter 23a of the communicator 23 transmits the passage command generated by the command generator 21 to the communicator 18 of the travelling vehicle 3. For example, the communicator 23 transmits the passage command as part of the information request for requesting transmission of the state information. Note that the communicator 23 may transmit the passage command to the travelling vehicle 3 separately from the information request. For example, when the command generator 21 generates the passage command, the communicator 23 may transmit the passage command without waiting for the next information request.

After passage of the priority travelling vehicle 3a through the points (the destinations DNb, DNc, DNd of the normal travelling vehicles 3b, 3c, 3d), the command generator 21 generates cancel commands for canceling passage through the points to the normal travelling vehicles 3b, 3c, 3d, to which the passage commands have been transmitted. For example, the cancel command to the normal travelling vehicle 3b is a command to permit stoppage at the destination DNb, the cancel command to the normal travelling vehicle 3c is a command to permit stoppage at the destination DNc, and the cancel command to the normal travelling vehicle 3d is a command to permit stoppage at the destination DNd.

At the time of update of the state information (see, for example, FIG. 2A) from the priority travelling vehicle 3a, the command generator 21 refers to the current position (Pa) and the travelling scheduled distance (PL) of the priority travelling vehicle 3a, to specify the updated predetermined range RX. When the destination DNb of the normal travelling vehicle 3b, to which the passage command has been issued (or for which the passage command is valid), is out of the updated predetermined range RX, the command generator 21 generates the cancel command concerning this normal travelling vehicle 3b. This also applies to the normal travelling vehicles 3c, 3d.

The cancel command transmitter 23b of the communicator 23 transmits the cancel command generated by the command generator 21 to the communicator 18 of the travelling vehicle 3. For example, the communicator 23 transmits the cancel command as part of the information request for requesting transmission of the state information. Note that the communicator 23 may transmit to the travelling vehicle 3 the cancel command separately from the information request. For example, when the command generator 21 generates the cancel command, the communicator 23 may transmit the cancel command without waiting for the next information request.

In the state table ST of FIG. 2B, the "passage command state" is information indicating whether the passage command is in a valid state or in an invalid state (a state where passage has been canceled or a state where stoppage is permitted). For example, for travelling vehicle 3 with the "travelling vehicle ID" of "01", the "passage command state" is represented as "SR1." "SR1" is a flag representing, for example, a state where the passage command is invalid as "0" and a state where the passage command is valid as "1." The command generator 21 specifies the "travelling vehicle ID" of the travelling vehicle 3 with the "destination" being present in the predetermined range RX of the priority travelling vehicle 3a, to generate a passage command to this travelling vehicle 3 and changes the "passage command state" to "1." When the "destination" of the travelling vehicle 3 with the "passage command state" of "1" is out of the predetermined range RX of the priority travelling vehicle 3a, the command generator 21 generates a cancel command to this travelling vehicle 3 and changes the "passage command state" of this travelling vehicle 3 to "0." When the "passage command state" is "0", the normal travelling vehicle 3b executes the transport command (loading or unloading at the destination DNb) that travelling vehicle 3b originally has. Similarly, when the "passage command states" are "0", the normal travelling vehicles 3c, 3d execute the transport commands (loading or unloading at the destinations DNc, DNd) that the normal travelling vehicles 3c, 3d originally have.

Further, when the communicator 18 receives the passage command, the route setter 17 of the travelling vehicle 3 reconstructs (resets) the travelling route of this travelling vehicle 3. For example, since a route after passage through the destination DNb is not specified by the travelling command of the host controller 4, the normal travelling vehicle 3b uses the sections R1 to R4 belonging to the main route as the travelling route. These sections R1 to R4 are a circling route including the destination DNb, and the route setter 17 constructs information of the circling route (the sections R1 to R4) such that the travelling vehicle 3b passes through the point (the destination DNb) and again arrives at the point (the destination DNb).

The travelling controller 16 causes the normal travelling vehicle 3b to travel along the travelling route reconstructed by the route setter 17. As thus described, when receiving the passage command from the host controller 4, the normal travelling vehicle 3b passes through the destination DNb and then travels on the circling route (the sections R1 to R4) including the destination DNb. For example, the route setter 17 previously adds a circling requirement flag to the information of the circling route, and the travelling controller 16 travels on the circling route until the circling requirement flag is withdrawn.

Further, when the communicator 18 receives the cancel command, the route setter 17 of the normal travelling vehicle 3b reconstructs (resets) the travelling route of the normal travelling vehicle 3b. The route setter 17 reconstructs the travelling route such that, when the normal travelling vehicle 3b arrives at the destination DNb the next time, the normal travelling vehicle 3b stops at the destination DNb. For example, the route setter 17 withdraws the circling requirement flag from the information of the circling route to reconstruct the travelling route. The travelling controller 16 causes the normal travelling vehicle 3b to travel, to the destination DNb, along the travelling route reconstructed by the route setter 17. Note that, instead of withdrawing the circling requirement flag, the route setter 17 may add a circling non-requirement flag to the information of the circling route. Similarly to the normal travelling vehicle 3b, when receiving the passage commands and receiving the cancel commands, the normal travelling vehicles 3c, 3d also reconstruct the travelling routes.

Figure 3:
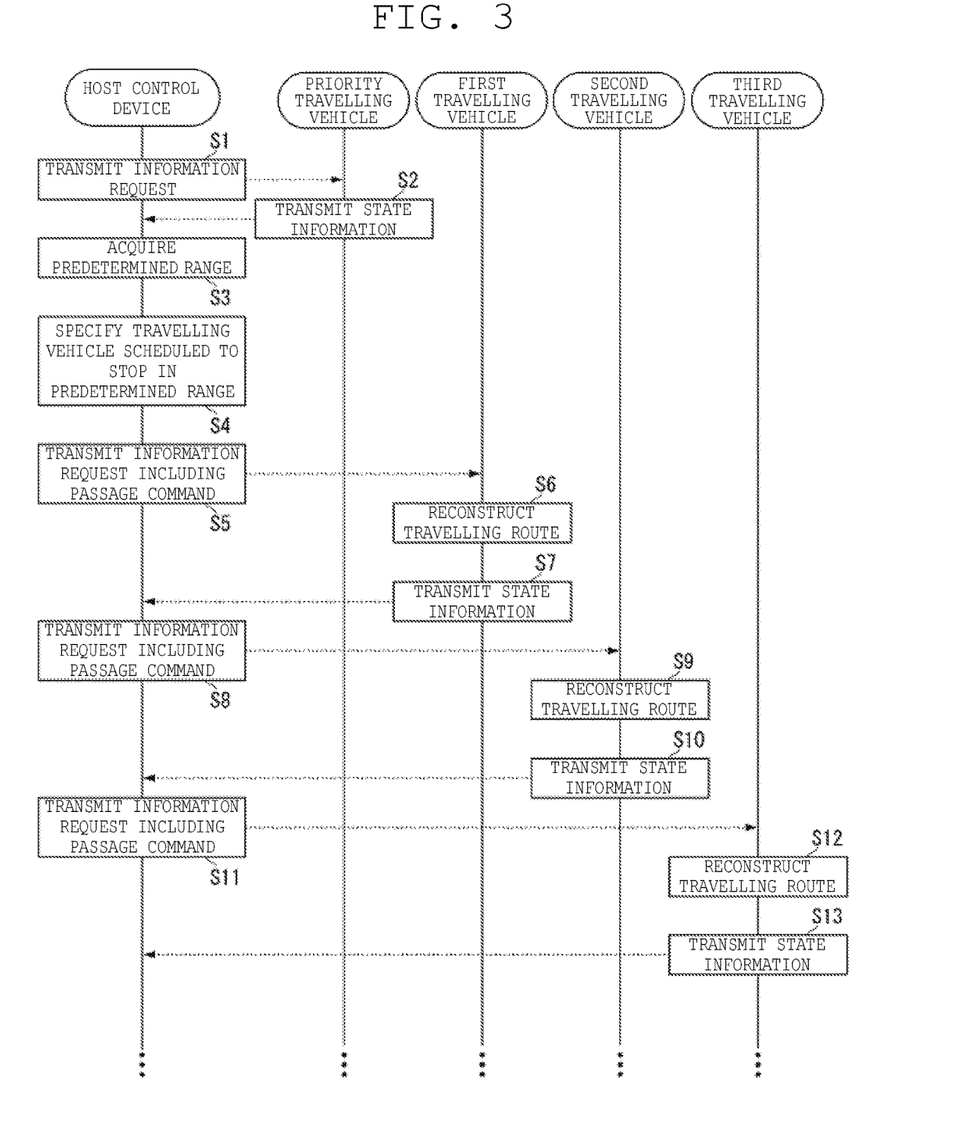
FIG. 3 is a sequence diagram illustrating a method for controlling the travelling vehicle system according to a preferred embodiment of the present invention.
Figure 4:
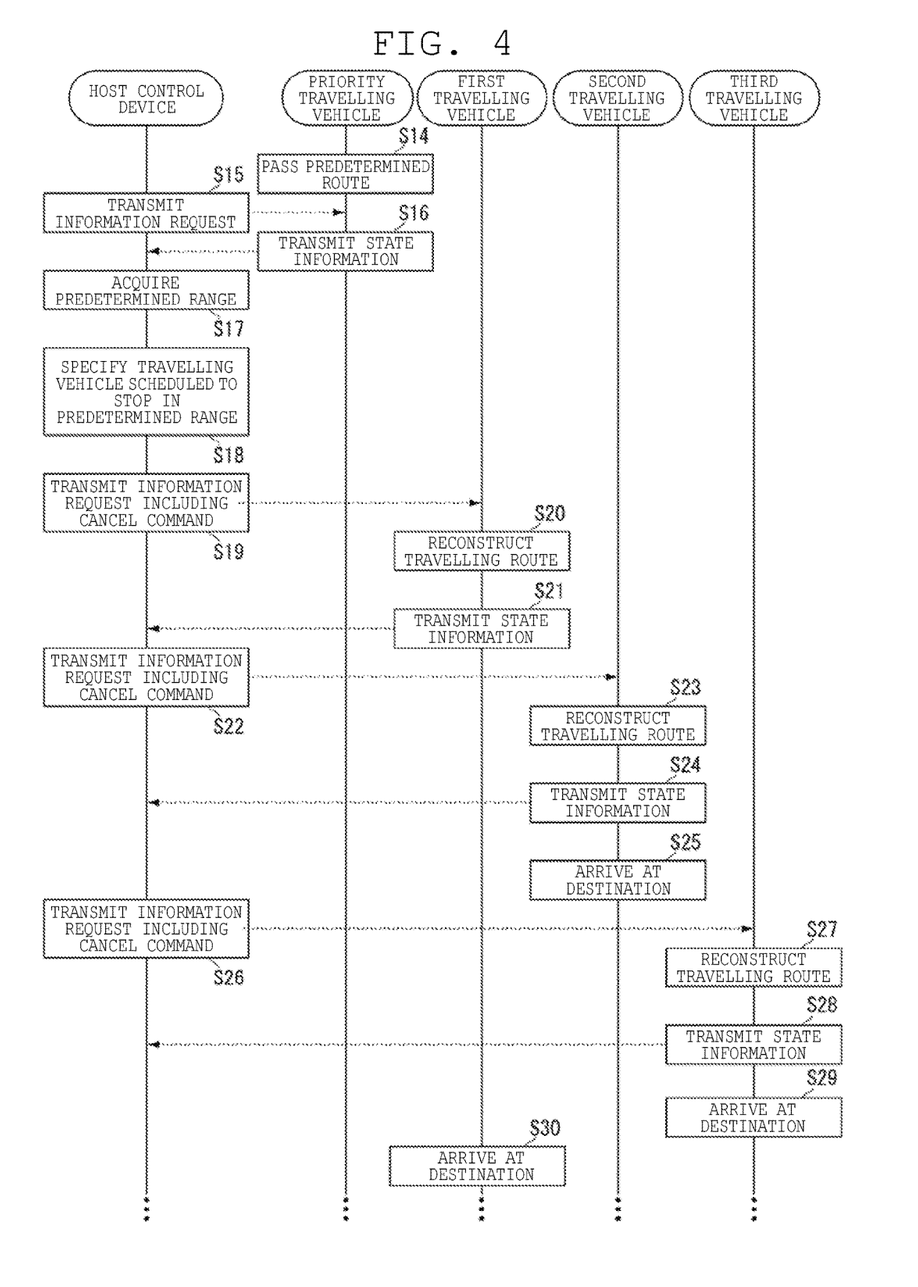
FIG. 4 is a sequence diagram continued from FIG. 3.

Next, based on the configuration and operation of the travelling vehicle system 1 described above, a method for controlling the travelling vehicle system 1 according to a preferred embodiment of the present invention will be described. FIGS. 3 and 4 are sequence diagrams illustrating the method for controlling the travelling vehicle system according to the present preferred embodiment. FIGS. 5A to 5C and FIGS. 6A to 6C are diagrams illustrating a first example of operation of the travelling vehicle system according to the present preferred embodiment. In FIGS. 3 and 4, the "first travelling vehicle" is the normal travelling vehicle 3b of FIGS. 5A to 5C and FIGS. 6A to 6C, the "second travelling vehicle" is the normal travelling vehicle 3c of FIGS. 5A to 5C and FIGS. 6A to 6C, and the "third travelling vehicle" is the normal travelling vehicle 3d of FIGS. 5A to 5C and FIGS. 6A to 6C.

In step S1, the communicator 23 of the "host controller" transmits an information request to the communicator 18 of the "priority travelling vehicle", and the communicator 18 receives the information request. In step S2, the communicator 18 of the "priority travelling vehicle" transmits state information to the communicator 23 of the "host controller" as a response to the information request in step S1, and the communicator 23 of the "host controller" receives the state information (see, for example, FIG. 5A). When the communicator 23 receives the state information, the "host controller" updates the state table ST (see, for example, FIG. 2B). The command generator 21 of the "host controller" refers to the state table ST to determine whether or not a transmission source of the state information in step S2 is the "priority travelling vehicle."

Figure 5A:
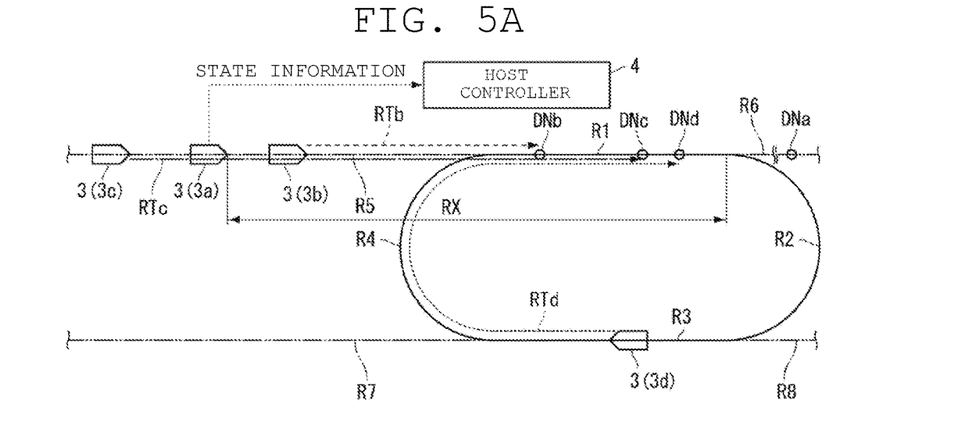
FIGS. 5A to 5C are diagrams illustrating a first example of operation of the travelling vehicle system according to a preferred embodiment of the present invention.
Figure 5B:
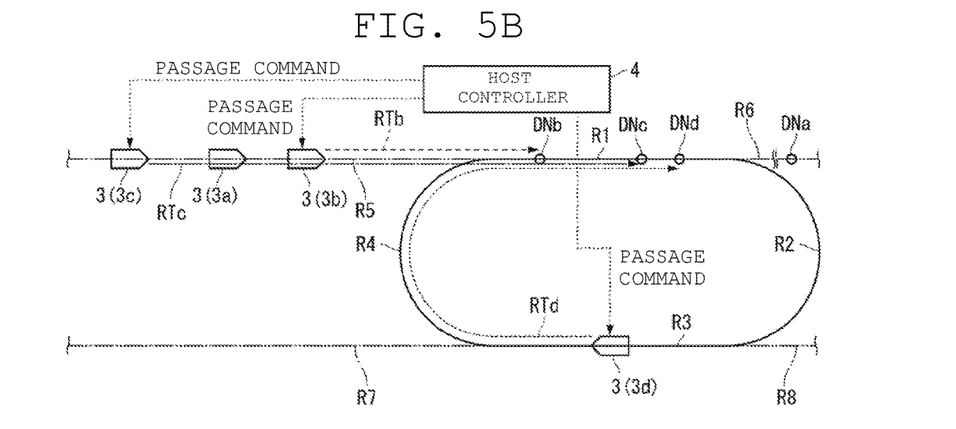
Figure 5C:
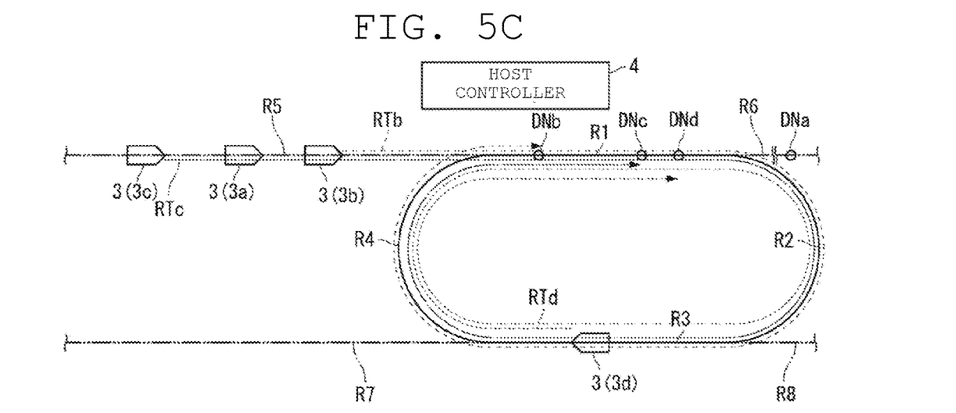

When the transmission source of the state information in step S2 is the "priority travelling vehicle, the priority travelling vehicle transmitter 25 selects the priority travelling vehicle 3a, and in step S3, the command generator 21 of the "host controller" acquires the predetermined range RX (see, for example, FIG. 5A). For example, taking the "current position" in the state table ST (see, for example, FIG. 2B) as a start point of the predetermined range RX, the command generator 21 calculates a terminal point of the predetermined range RX by using the "travelling scheduled distance" in the state information SD (see, for example, FIG. 2A), to acquire the predetermined range RX.

In step S4, the command generator 21 of the "host controller" refers to the "destinations" in the state table ST (see, for example, FIG. 2B) to specify the normal travelling vehicles 3b, 3c, 3d (see, for example, FIG. 5A) that is scheduled to stop in the predetermined range RX. The command generator 21 generates a passage command to the normal travelling vehicle 3b, and changes the "passage command state" of the normal travelling vehicle 3b to a valid state (see, for example, "1") in the state table ST (see, for example, FIG. 2B). Similarly, the command generator 21 generates passage commands to the normal travelling vehicles 3c, 3d, and changes the "passage command state" of the normal travelling vehicles 3c, 3d to a valid state (e.g., "1") in the state table ST (see, for example, FIG. 2B).

In step S5, the passage command transmitter 23a in the communicator 23 of the "host controller" transmits an information request including the passage command to the communicator 18 of the "first travelling vehicle" (the normal travelling vehicle 3b of FIG. 5B), and the communicator 18 receives the information request. In step S6, the route setter 17 of the "first travelling vehicle" constructs, as a travelling route RTb, a circling route (the sections R1, R2, R3, R4) in which the travelling vehicle passes through the destination DNb (see, for example, FIG. 5C) and again arrives at the destination DNb. In step S7, the communicator of the "first travelling vehicle" transmits the state information to the communicator 23 of the "host controller", and the communicator 23 receives the state information.

In step S8, the passage command transmitter 23a in the communicator 23 of the "host controller" transmits an information request including the passage command to the communicator 18 of the "second travelling vehicle" (the normal travelling vehicle 3c of FIG. 5B), and the communicator 18 receives the information request. In step S9, the route setter 17 of the "second travelling vehicle" constructs, as a travelling route RTc, a circling route (the sections R1, R2, R3, R4) in which the travelling vehicle passes through the destination DNc (see, for example, FIG. 5C) and again arrives at the destination DNc. In step S10, the communicator 18 of the "second travelling vehicle" transmits the state information to the communicator 23 of the "host controller", and the communicator 23 receives the state information.

In step S11, the passage command transmitter 23a in the communicator 23 of the "host controller" transmits an information request including the passage command to the communicator 18 of the "third travelling vehicle" (the normal travelling vehicle 3d of FIG. 5B), and the communicator 18 receives the information request. In step S12, the route setter 17 of the "third travelling vehicle" constructs, as the travelling route RTd, a circling route (the sections R3, R4, R1, R2) in which the travelling vehicle passes through the destination DNd (see, for example, FIG. 5C) and again arrives at the destination DNd. In step S13, the communicator 18 of the "third travelling vehicle" transmits the state information to the communicator 23 of the "host controller", and the communicator 23 receives the state information. Note that the "host controller" may almost simultaneously perform two or more of the transmission of the information request in step S5, the transmission of the information request in step S8, and the transmission of the information request in step S11. Further, the order of the transmission of the information request in step S5, the transmission of the information request in step S8, and the transmission of the information request in step S11 is able to be changed in a freely selectable manner.

Figure 6A:
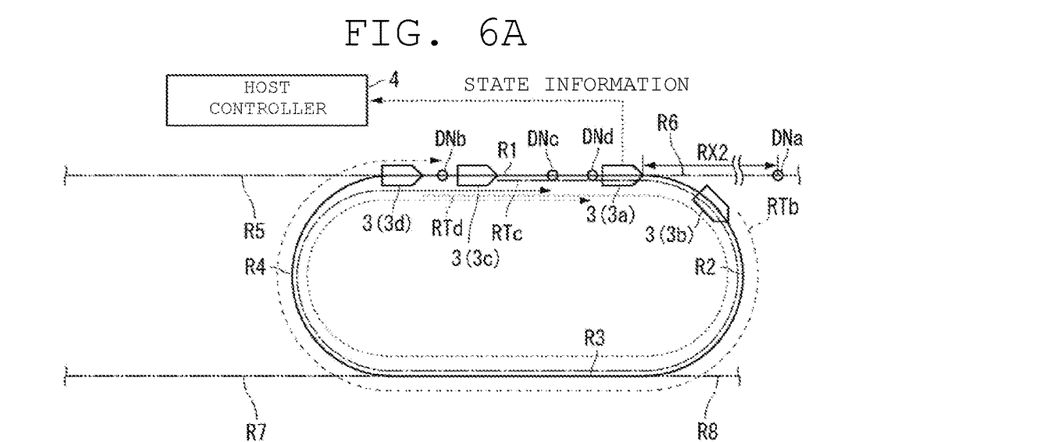
FIGS. 6A to 6C are diagrams illustrating the first example of operation of the travelling vehicle system according to a preferred embodiment of the present invention.
Figure 6B:
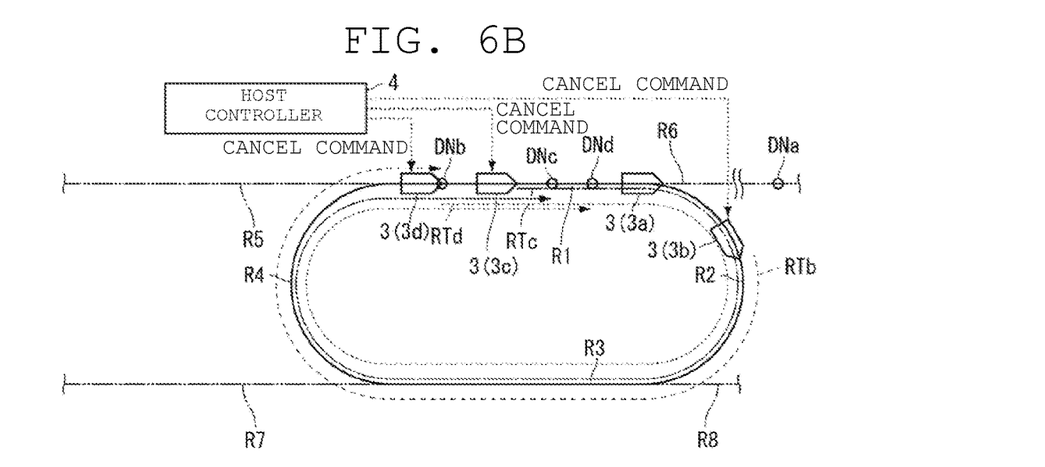
Figure 6C:
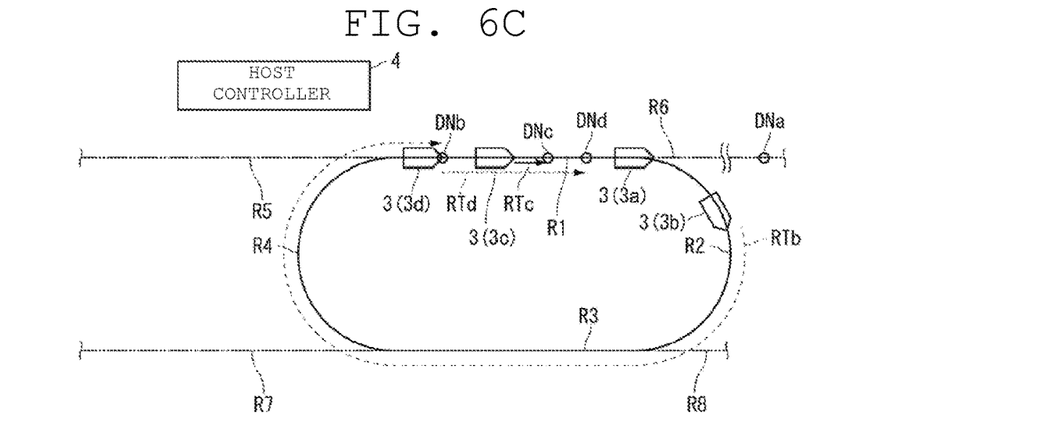

Moving to a description of FIG. 4, the "priority travelling vehicle" passes through the predetermined range RX in step S14. In step S15, the communicator 23 of the "host controller" transmits an information request to the communicator 18 of the "priority travelling vehicle", and the communicator 18 receives the information request. In step S16, the communicator 18 of the "priority travelling vehicle" transmits the state information to the communicator 23 of the "host controller", and the communicator receives the state information. In step S17, the command generator 21 of the "host controller" acquires an updated predetermined range RX2 (see, for example, FIG. 6A) as in step S3. In FIG. 6A, the predetermined range RX2 is a range to the destination DNa.

In step S18, the command generator 21 of the "host controller" specifies the travelling vehicle 3 scheduled to stop in the updated predetermined range RX2 as in step S4. Further, the command generator 21 determines in the state table ST (see, for example, FIG. 2B) whether or not the "destinations" of the normal travelling vehicles 3b, 3c, 3d with the "passage command states" being valid are in the updated predetermined range RX2. In FIG. 6A, all of the destination DNb of the normal travelling vehicle 3b, the destination DNc of the normal travelling vehicle 3c, and the destination DNd of the normal travelling vehicle 3d are out of the updated predetermined range RX2 (none of the destinations is present in the predetermined range RX2). The command generator 21 generates a cancel command for passage to the normal travelling vehicle 3b, a cancel command for passage to the normal travelling vehicle 3c, and a cancel command for passage to the normal travelling vehicle 3d.

In step S19, the cancel command transmitter 23b in the communicator 23 of the "host controller" transmits an information request including the cancel command to the communicator 18 of the "first travelling vehicle" (the normal travelling vehicle 3b of FIG. 6B), and the communicator 18 receives the information request. In step S20, the route setter 17 of the "first travelling vehicle" constructs the travelling route RTb on which the "first travelling vehicle" stops at the destination DNb (see, for example, FIG. 6C). In step S21, the communicator 18 of the "first travelling vehicle" transmits the state information to the communicator 23 of the "host controller", and the communicator 23 receives the state information. In step S30, the "first travelling vehicle" arrives at the destination DNb and stops travelling.

In step S22, the cancel command transmitter 23b in the communicator 23 of the "host controller" transmits an information request including the cancel command to the communicator 18 of the "second travelling vehicle" (the normal travelling vehicle 3c of FIG. 6B), and the communicator 18 receives the information request. In step S23, the route setter 17 of the "second travelling vehicle" constructs the travelling route RTc on which the "second travelling vehicle" stops at the destination DNc (see, for example, FIG. 6C). In step S24, the communicator 18 of the "second travelling vehicle" transmits the state information to the communicator 23 of the "host controller", and the communicator 23 receives the state information.

In step S25, the "second travelling vehicle" arrives at the destination DNc and stops travelling. In FIGS. 5A to 5C and FIGS. 6A to 6C, the "second travelling vehicle" receives the passage command and sets the travelling route RTc on which the "second travelling vehicle" passes through the destination DNc (see, for example, FIG. 6A). However, by receiving the cancel command before passing through the destination DNc (see, for example, FIG. 6B), the "second travelling vehicle" actually arrives at the destination DNc without passing through the destination DNc.

In step S26, the cancel command transmitter 23b in the communicator 23 of the "host controller" transmits an information request including the cancel command to the communicator 18 of the "third travelling vehicle" (the normal travelling vehicle 3d of FIG. 6B), and the communicator 18 receives the information request. In step S27, the route setter 17 of the "third travelling vehicle" constructs the travelling route RTd on which the "third travelling vehicle" stops at the destination DNd (see, for example, FIG. 6C). In step S28, the communicator 18 of the "third travelling vehicle" transmits the state information to the communicator 23 of the "host controller", and the communicator 23 receives the state information.

In step S29, the "third travelling vehicle" arrives at the destination DNd and stops travelling. In FIGS. 5A to 5C and FIGS. 6A to 6C, the "third travelling vehicle" receives the passage command and sets the travelling route RTd on which the "third travelling vehicle" passes through the destination DNd (see, for example, FIG. 6A). However, by receiving the cancel command before passing through the destination DNd (see, for example, FIG. 6B), the "third travelling vehicle" actually arrives at the destination DNd without passing through the destination DNd.

Note that, when the normal travelling vehicle 3d (the "third travelling vehicle") merges into the same route (the section R1) as the priority travelling vehicle 3a, the normal travelling vehicle 3d comes behind the priority travelling vehicle 3a in FIGS. 5A to 5C and FIGS. 6A to 6C, but may come ahead of the priority travelling vehicle 3a. In this case, similarly to the normal travelling vehicle 3b, the normal travelling vehicle 3d passes through the destination DNd, travels on the circling route (R1 to R4), and arrives at the destination DNd. Note that the "host controller" may almost simultaneously perform two or more of the transmission of the information request in step S19, the transmission of the information request in step S22, and the transmission of the information request in step S26. Further, the order of the transmission of the information request in step S19, the transmission of the information request in step S22, and the transmission of the information request in step S26 is able to be changed in a freely selectable manner.

Further, when a travelling vehicle to be overtaken by a priority travelling vehicle is identified based on operation states of a plurality of travelling vehicles and its circling route is decided as in Japanese Patent No. 4,182,874 described above, there is a concern that such processing may become complicated. For example, determining whether or not the travelling vehicle obstructs the priority travelling vehicle requires complicated processing such as accurate prediction and comparison of the timing for stoppage of the travelling vehicle and the timing for arrival of the priority travelling vehicle at the stop position of the travelling vehicle. Further, when a plurality of travelling vehicles are present, the processing becomes further complicated. In contrast, in the present preferred embodiment, the travelling vehicle is selected using the predetermined range which the priority travelling vehicle 3a is scheduled to pass through, the destination DNb at which the normal travelling vehicle 3b or the like is scheduled to stop, and the like, thus eliminating the need to obtain, for example, the travelling order, the current positional relation, or the like of the priority travelling vehicle 3a and the normal travelling vehicle 3b and the like, and allowing smooth travelling of the priority travelling vehicle 3a by simple control.

In the above-described preferred embodiment, the host controller 4 preferably includes a computer system, for example. The host controller 4 preferably reads a control program stored in the storage 24 and executes a variety of processing in accordance with this control program. This control program is a control program that causes a computer to execute control of a travelling vehicle system including a plurality of travelling vehicles that travel along a route, and a host controller that controls the travelling vehicles, the control including: selecting a priority travelling vehicle among the plurality of travelling vehicles; transmitting a passage command to a normal travelling vehicle to pass through a point in a predetermined range on the route which the priority travelling vehicle is scheduled to pass through, the normal travelling vehicle having a stop command to schedule to stop at the point; transmitting a cancel command to the normal travelling vehicle to cancel the given passage command when the priority travelling vehicle passes through the point; and causing the normal travelling vehicle to stop at the point in accordance with the stop command of the normal travelling vehicle, when the normal travelling vehicle receives the cancel command. This control program may be recorded on a computer readable memory medium and then provided, for example.

Note that the technical scope of the present invention is not limited to the aspect described in the above-described preferred embodiments and the like. One or more of the features or elements described in the above-described preferred embodiments and the like may be omitted. Further, the features or elements described in the above-described preferred embodiment and the like can be combined as appropriate.

Although the host controller 4 transmits the passage command to the travelling vehicle 3 to pass through the point in the above-described preferred embodiments, a command may be transmitted to the travelling vehicle 3 as the passage command to travel around the circling route including the point. Although the command generator 21 of the host controller 4 has calculated the predetermined range RX based on the state information in the above-described preferred embodiments, the travelling controller 16 or the route setter 17 of the travelling vehicle 3 may calculate the predetermined range RX and the communicator 18 of the travelling vehicle 3 may transmit the information of the predetermined range RX to the host controller 4.

Note that, when one travelling vehicle 3 is the normal travelling vehicle other than the priority travelling vehicle, this travelling vehicle 3 does not need to transmit information concerning the predetermined range to the host controller 4. For example, the host controller 4 notifies the priority travelling vehicle 3a that it is a priority travelling vehicle, and when one travelling vehicle 3 is the priority travelling vehicle, this travelling vehicle 3 may transmit information concerning the predetermined range to the host controller 4.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A travelling vehicle system comprising:
   a plurality of travelling vehicles that travel along a route; and
   a host controller that controls the travelling vehicles;
   wherein
   the host controller is configured or programmed to include:
   a priority travelling vehicle transmitter that selects a priority travelling vehicle among the plurality of travelling vehicles;
   a passage command transmitter that transmits a passage command to a normal travelling vehicle to pass through a point in a predetermined range on the route which the priority travelling vehicle is scheduled to pass through, the normal travelling vehicle receiving a stop command to schedule to stop at the point; and a cancel command transmitter that transmits a cancel command to the normal travelling vehicle to cancel the given passage command when the priority travelling vehicle passes through the point; wherein the normal travelling vehicle stops at the point in accordance with the stop command of the normal travelling vehicle when the normal travelling vehicle receives the cancel command from the cancel command transmitter.

2. The travelling vehicle system according to claim 1, wherein, when the normal travelling vehicle with the stop command receives the passage command from the passage command transmitter and then receives the cancel command from the cancel command transmitter before passing through the point, the normal travelling vehicle stops at the point in accordance with the stop command without passing through the point.

3. The travelling vehicle system according to claim 1, wherein the normal travelling vehicle with the stop command periodically transmits, to the host controller, state information indicating the point at which the normal travelling vehicle is scheduled to stop; and the host controller uses the state information to select the normal travelling vehicle being a target that transmits the passage command among the plurality of travelling vehicles.

4. The travelling vehicle system according to claim 3, wherein the predetermined range is a range in which the priority travelling vehicle travels after transmission of the state information until transmission of the next state information.

5. The travelling vehicle system according to claim 4, wherein the priority travelling vehicle calculates the predetermined range by using a travelling speed and a period in which the state information is transmitted, and transmits a calculation result to the host controller as part of the state information.

6. The travelling vehicle system according to claim 3, wherein the host controller transmits an information request to request the state information to each of the plurality of travelling vehicles; and each of the plurality of travelling vehicles transmits the state information to the host controller as a response to the information request.

7. The travelling vehicle system according to claim 6, wherein the host controller transmits the passage command or the cancel command as part of the information request.

8. A method for controlling a travelling vehicle system including a plurality of travelling vehicles that travel along a route, and a host controller that controls the travelling vehicles, the method comprising:

selecting a priority travelling vehicle among the plurality of travelling vehicles;

transmitting a passage command to a normal travelling vehicle to pass through a point in a predetermined range on the route which the priority travelling vehicle is scheduled to pass through, the normal travelling vehicle receiving a stop command to schedule to stop at the point;

transmitting a cancel command to the normal travelling vehicle to cancel the given passage command when the priority travelling vehicle passes through the point; and causing the normal travelling vehicle to stop at the point in accordance with the stop command of the normal travelling vehicle, when the normal travelling vehicle receives the cancel command.

* * * * *